March 27, 1962 M. K. APPIUS 3,026,954
BALANCE
Filed Sept. 17, 1959
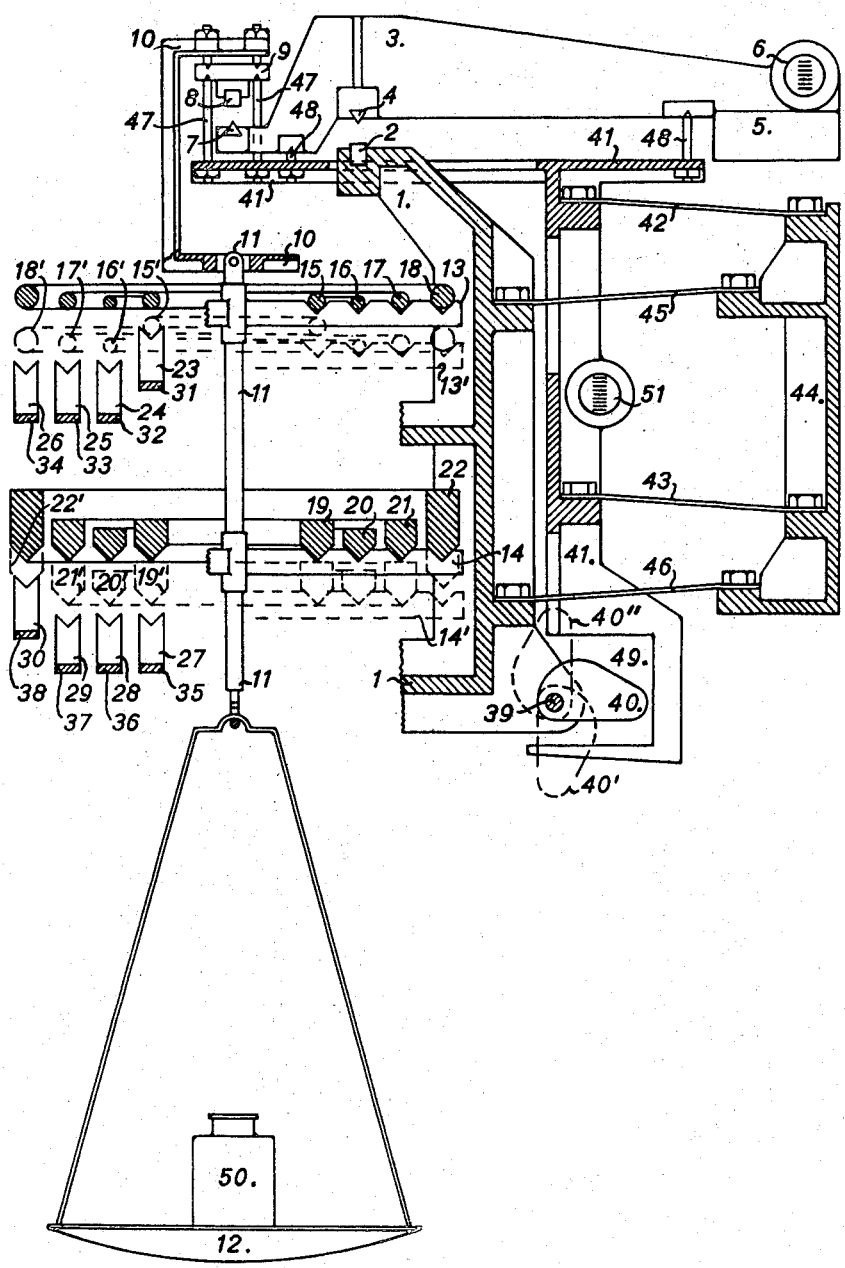

United States Patent Office 3,026,954
Patented Mar. 27, 1962

3,026,954
BALANCE
Max Karl Appius, Rapperswil, Switzerland, assignor to Erhard Mettler, Zurich, Switzerland
Filed Sept. 17, 1959, Ser. No. 840,670
Claims priority, application Switzerland Jan. 31, 1959
3 Claims. (Cl. 177—248)

This invention relates to a balance and more particularly to a laboratory or analytical balance, comprising an asymmetrical balance beam having a center knife edge, a terminal knife edge and a counterpoise, a balance rack having a bearing for pivotally supporting the center knife edge of said balance beam, a pan carrier supporting a weighing pan and having a bearing for its suspension from the terminal knife edge of said balance beam, brackets on said pan carrier adapted to receive control weights, and a control mechanism for lifting off said control weights from said brackets.

Objects of the invention are to provide a balance of the type stated in which an arresting mechanism includes a movable slide which in a raised position, supports said balance beam so that its center knife edge is lifted off said bearing of the balance rack and further supports said pan carrier so that its bearing is lifted off said terminal knife edge of the balance beam, and which in its lowest position allows said center knife edge to be placed on said bearing of the balance rack and allows said bearing of the pan carrier to be placed on said terminal knife edge of the balance beam so that by means of said asymmetrical balance beam a fine-weighing process of the article to be weighed can be carried out; in which balance said slide of the arresting mechanism is the movable member of a rough-weighing apparatus which operates, when said slide is in said raised position and supports said arrested asymmetrical balance beam and said arrested pan carrier, to weigh roughly the slide, the asymmetrical balance beam and its counterpoise, the carrier and the scale pan, and the article to be weighed. A further object of the invention is to provide a balance of the kind outlined and including a plurality of leaf springs acting between said balance rack and said slide for guiding the slide to have a parallelogrammatic motion and holding the slide in said raised position whereas the asymmetrical balance beam and the pan carrier are arrested and wherein said leaf springs and said slide perform as a spring balance to weigh roughly said arrested balance beam together with said arrested pan carrier and the article laid on it; said balance including manually operable arresting means for forcing downwards said slide from said raised position in a lowest position in order to release the asymmetrical balance beam and the pan carrier for a fine-weighing process of the article laid on the balance pan.

These and other objects and the advantages of the invention will best be understood from the following description of a specific embodiment when read in connection with the accompanying drawing in which, for the sake of clarity, none of the parts which are not directly necessary for an understanding of the invention are shown in detail.

The balance rack 1, which is only partially shown, is provided at the upper end of a cantilever arm with the plate-like bearing 2 on which the beam 3 of asymmetrical construction can rest pivotally by means of its center knife edge 4 when fine weighing is being carried out. On a longer arm, the beam 3 has a counterpoise 5 rigidly connected thereto and a graduated or numbered dial 6 by means of which, after optical enlargement in a manner known per se, the inclination of the beam 3 and hence the last weight decimals of the weight of the article to be weighed can be determined or read off. On the other shorter arm, the beam 3 is equipped with the terminal knife edge 7 on which a carrier is pivotally supported when fine weighing is being carried out. This carrier comprises an intermediate member 9 which is provided with the bearing 8 and on which a stirrup 10 is articulated by means of the usual pivot bearing. Suspended from this stirrup 10 means for a further articulation include a downwardly extending rod 11 which carries a hook at its lower end. The scale pan 12 is suspended from the hook by means of a carrier yoke, as shown in the drawing.

The rod 11 of the carrier 8 to 11 also comprises, arranged one above the other, two sets of brackets 13 and 14, the three brackets of each set projecting horizontally from the rod 11 and offset by 120° in relation to one another like the spokes of a wheel. Only the brackets which extend in the plane of the drawing are fully illustrated in the drawing; the brackets which project obliquely forwards are represented broken off, while the brackets running obliquely towards the rear are not visible in the drawing. All the brackets 13, 14 have wedge-shaped recesses which become wider towards the top and in which can rest horizontal annular weights 15 to 22 which are concentric with one another. The annular weights 15 to 18 form a first decimal set of control weights, the annular weights 15 and 16 each having one unit of weight, for example, the annular weight 17 two units of weight and the annular weight 18 five units of weight. In a corresponding manner, the annular weights 19 and 20 then each have ten units of weight, the annular weight 21 twenty units of weight and the annular weight 22 fifty units of weight. In by far the majority of cases, however, not merely two sets of control weights, but three or four sets of control weights are provided which are arranged in sets one below the other. The rod 11 then has a corresponding number of brackets which project radially from the rod 11 likewise below one another in groups of three.

For the sake of clarity, the control mechanism for actuating the annular weights 15 to 22 is only partially illustrated; it uses lifting members 23 to 30 which are below the annular weights and have wedge-shaped recesses which widen out towards the top so that the annular weights 15 to 22 can be raised from below. The lifting members 23 to 30 are mounted fixed on levers 31 to 38 which are pivotally mounted, in a known manner not illustrated in detail, on the balance rack 1 and are raised or lowered by means of cams. The means for raising and lowering the levers are known in the art (as illustrated, for example, by the U.S. Patent No. 2,764,-400) and do not constitute part of the present invention. In the drawing, the lifting members 32 to 37 are represented in the lowered position and the lifting members 31 and 38 in the raised position. Allocated to each annular weight are three simultaneously actuated lifting members which are offset by 120° in relation to one another in the circumferential direction so that the annular weights 15 to 22 retain their horizontal position during the raising and lowering. Only the lifting members which are in the plane of the drawing are shown, while the other lifting members which would extend in front of and behind the plane of the drawing, are not illustrated. Otherwise, the control mechanism is constructed in a manner known per se in such a manner that the control weights for each ten units of weight are actuated in a controlled sequence so that the total weight is adjustable in steps of the unit of weight.

The arersting mechanism for arresting the beam 3 and the carrier 8 to 11, and the control mechanism 23 to 38 for actuating the annular control weights 15 to 22, are adapted to one another in such a manner that when the carrier 8 to 11 is arrested and raised sufficiently, all the control weights 15 to 22 rest on the brackets 13 to 14 regardless of whether the lifting members 23 to 30 of the control mechanism 23 to 38, allocated to the individual control weights are in the lowered or raised position. Such an arrested position of the carrier 8 to 11 and the brackets 13 to 14 is illustrated in bold lines in the drawing. Only when the carrier 8 to 11 and also the pan 12 has been lowered, by means of the arresting mechanism which will be described below, to such an extent that the brackets 13 to 14 pass out of the positions illustrated in full lines into the positions 13' to 14' shown in broken lines, do the lifting members 23 to 30 become operative as illustrated by the resulting positions 15' to 22' of the control weights 15 to 22, likewise shown in broken lines. In the lowered position of the carrier 8 to 11, which is illustrated by the positions 13' to 14' of its brackets 13 to 14 shown in broken lines, only the control weights 16 to 21 still rest on the brackets while the control weights 15 and 22 rest on their associated lifting members 23 and 30 are are raised from the brackets 13 to 14.

The arresting mechanism already mentioned above is actuated by means of a spindle 39 which is generally rotated by hand and which is mounted for rotation in the balance rack 1 and comprises a camplate 40. A movable slide 41 engages, with its forked foot, round the camplate 40 so that, as a result of suitable turning of the camplate 40 it can be brought into various positions of height which will be explained in more detail below. In contrast to the usual constructions of the arresting mechanism, the slide 41 is guided parallel by means of two leaf springs 42 and 43 of equal length from an intermediate member 44. The intermediate member 44 is in turn guided parallel by means of a further pair of leaf springs 45, 46 from the balance rack 1, so that with leaf springs 42, 43, 45, 46 of equal length, the slide 41 can be moved in a substantially straight line in the vertical direction completely without play. The plate-like head of the slide 41 comprises three arresting pins 47 which act from below on the intermediate member 9 of the carrier 8 to 11 and support it in the arrested position illustrated. In the drawing, only the two arresting pins 47 projecting upwards behind the plane of the drawing are illustrated, while the third arresting pin, which is in front of the plane of the drawing, is not shown. Furthermore, three other arresting pins 48 are secured to the slide 41 by means of which the beam 3 can be arrested. The arresting pins 48 act from below on the beam 3, two of them supporting the longer arm of the beam and the third substantially in the middle of the shorter arm of the beam 3 in its arrested position. In the drawing, only the rear one of the two arreting pins 48 acting close to the counterpoise 5 is shown.

Now the arresting mechanism 39 to 48 described is also used as a preliminary balance; accordingly, the recess 49 in the slide 41 is so dimensioned in relation to the camplate 40 that when the latter is in the position illustrated in full lines, the slide 41 has adequate freedom of movement in the vertical direction, upwards and downwards. Furthermore, the leaf springs 42, 43, 45, 46 are initially bent in such a manner that when the pan 12 is unloaded, the carrier 8 to 11 arrested, the beam 3 arrested and the control weights 15 to 22 resting on the brackets 13 to 14, the slide 41 rises so far in relation to the mid-position illustrated, that its lower forked portion is just out of contacts with the camplate 40. Conversely, if the maximum load is placed on the pan 12, the slide 41, together with the arrested beam 3 and the arrested carrier 8 to 11—still with the control weights 15 to 22 resting on the brackets 13 to 14—should sink so far in relation to the mid-position shown in full lines that its upper forked portion does not yet touch the camplate 40. Within this range of movement of the slide 41, the arresting mechanism 39 to 48 accordingly acts as a spring balance, and the article 50 to be weighed, which has been placed on the pan 12, is roughly weighed together with the pan 12, the carrier 8 to 11, all the control weights 15 to 22 and the beam 3 including its counterpoise 5. Since the parts of the balance resting on the slide 41 have a constant weight, a graduated or numbered dial 51 can be provided on the slide 41 which indicates directly, if necessary by means of optical enlargement, the first weight decimals of the article 50 to be weighed. Thus the position of the camplate which is illustrated in full lines in the drawing and in which the slide 41 has the freedom of movement necessary for the rough weighing of the article 50 may be referred to as the rough-weighing position of the arresting mechanism 39 to 48.

In order to carry out a fine weighing of the article 50, the spindle 39 is turned in clockwise direction until the camplate 40 assumes the position 40' shown in broken lines. As a result, the slide 41 is forced downwards so that first the center knife edge 4 of the beam 3 is placed on the bearing 2 and then the bearing 8 of the intermediate member 9 is deposited on the terminal knife edge 7. Thus the carrier 8 to 11 and the pan 12 suspended therefrom are also lowered. When the slide 41 is in the lowest position, the upper and lower forks of its foot just rest on the camplate 40 provided that the vertical dimension of the recess 49 is equal to the maximum dimension of the camplate 40. Thus, when the camplate is in the position 40', the slide 41 is locked in its lowest position without any freedom of movement in the vertical direction. In this lowest position of the slide 41, which may be referred to as the fine-weighing position of the arresting mechanism 39 to 48, the arresting pins 48 are withdrawn downwards from the beam 3 and the arresting pins 47 are withdrawn downwards from the intermedate member 9 so that the beam 3 can pivot freely on the bearing 2 with the carrier 8 to 11 suspended from the terminal knife edge 7. In this no longer arrested position, the carrier 8 to 11 has decended so far that the brackets 13 and 14 assume the positions 13' to 14' shown in broken lines, in which, as already explained, the control mechanism 23 to 30 is operative and control weights 15 and 22 can be lifted from the brackets 13 to 14. In this fine-weighting position of the arresting mechanism 39 to 48, if just those control weights 15 and 22 are lifted from the brackets 13 to 14, the weight of which is equal to the first weight decimals of the article 50 to be weighed, then the beam 3 is approximately in equilibrium and its resulting inclination indicates the last weight decimals of the article 50, which can be read off by means of the graduated or numbered dial 6 fastened on the beam 3.

On the other hand, if the camplate 40 is turned in counterclockwise direction into the position 40'', then the slide 41 rises further in relation to the rough-weighing position illustrated in full lines, and both the beam 3 and the carrier 8 to 11 remain arrested and are also raised. Since in the position 40'', the forks of the slide 41 again bear against the camplate 40 at the top and bottom, the slide is again locked in the position 40'' of the camplate without having any freedom of movement in the vertical direction. Thus, when the cam plate is in the position 40'', the spring balance formed from the slide 41, the leaf springs 42, 43, 45, 46 and the intermediate member 44, is also locked. This last-mentioned position is therefore the position of rest of the arresting mechanism 39 to 48 which should be assumed when the balance is out of use.

When weighing is carried out, the procedure is as follows: The arresting mechanism 39 to 48 should assume the position of rest (position 40'' of the camplate). In this position of rest, the article 50 to be weighed is placed on the pan 12. By turning the spindle 39 the arresting mechanism 39 to 48 is transferred to the rough-weighing position (position of the camplate 40 as illustrated in full lines). In this rough-weighing position, the rough weight or the first weight decimals of the article 50 can be read off immediately by means of the graduated or numbered dial 51. The arresting mechanism is left in the rough-weighing position and the control mechanism 23 to 38 is actuated in such manner that the control weights to be raised (for example 15 and 22) likewise correspond to the rough weight read off. Then the arresting mechanism 39 to 48 is brought into the fine-weighing position (position 40' of the camplate). In the course of this, the pre-determined control weights 15 and 22 are automatically lifted from the brackets 13 to 14 as indicated by the positions 15' and 22' of these control weights, shown in broken lines. At the same time, the spring balance comprising the slide 41 is arrested, with the carrier 8 to 11 suspended from the terminal knife edge 7 of the balance beam 3, now acting as an inclination balance, so that the last weight decimals of the article 50 can be read off by means of the graduated or numbered dial 6. The arresting mechanism 39 to 48 is restored to the position of rest (position 40" of the camplate) and the weighed article can be removed from the pan 12.

The invention is not limited to the particular embodiment herein shown and described. Modifications which may occur to those familiar with the art fall within the spirit and scope of the invention as set forth in the following claims.

I claim:

1. A balance for determining the weight of an object comprising a balance rack having a bearing thereon; an asymmetrical balance beam having a center knife edge thereon arranged for engagement with said rack bearing to pivotally support said beam thereon, said balance beam having also a terminal knife dege and a counterpoise; a pan carrier having a bearing arranged for engagement with said terminal knife edge to pivotally suspend said pan carrier from said beam, said pan carrier having a plurality of brackets secured thereto and also including a weighing pan for receiving said object to be weighed; a plurality of control weights normally removably supported on said brackets; a slide adjacent said beam and said pan carrier; means supportingly connecting said slide to said rack for free vertical movement relative thereto, said slide normally having a rough-weighing position in engagement with said balance beam and said pan carrier to elevate said balance beam relative to said rack to space the center knife edge thereof above its associated rack bearing and supporting said pan carrier to space the bearing thereof above the terminal knife edge of said balance beam whereby said slide and said means supportingly connecting said slide to said rack support the combined weight of said balance beam, counterpoise, carrier and weighing pan; and manually operable means connected to said balance rack for moving said slide to a fine-weighing position wherein said balance beam is lowered to cause engagement of the center knife edge thereof with said bearing and said carrier is lowered to cause engagement of the bearing thereof with said terminal knife edge, said means supportingly connecting said slide to said rack comprising a plurality of leaf springs connected to cause said slide to move parallelogrammatically relative to said rack.

2. The invention as recited in claim 1, wherein said manually operable means include a camplate which is mounted for rotation on the balance rack and said slide including a recess in which the camplate extends so that in the rest position of the slide the camplate engages the upper wall of the recess, so that in the rough-weighing position of the slide the camplate is out of engagement with any wall of the recess by a distance sufficient to allow the necessary range of movement to the slide during the rough-weighing operation, and so that in the fine-weighing position of the slide the camplate engages the lower wall of the recess.

3. The invention as recited in claim 1, wherein said slide is guided to move in parallel by means of two leaf springs attached to the slide and to a movable intermediate member, which member is in turn guided to move in parallel by means of two leaf springs attached to said intermediate member and to the balance rack, the modes of attachment being such that the slide is movable substantially rectilinearly and vertically.

References Cited in the file of this patent

UNITED STATES PATENTS

| | | |
|---|---|---|
| 703,244 | Evans et al. | June 24, 1902 |
| 2,567,161 | Griffin | Sept. 4, 1951 |
| 2,581,807 | Mettler et al. | Jan. 8, 1952 |
| 2,764,400 | Mettler | Sept. 25, 1956 |

UNITED STATES PATENT OFFICE
CERTIFICATE OF CORRECTION

Patent No. 3,026,954                      March 27, 1962

Max Karl Appius

It is hereby certified that error appears in the above numbered patent requiring correction and that the said Letters Patent should read as corrected below.

Column 5, line 29, for "dege" read -- edge --; column 6, line 18, strike out "and" and insert instead a comma.

Signed and sealed this 3rd day of July 1962.

(SEAL)
Attest:

:RNEST W. SWIDER                      DAVID L. LADD
Attesting Officer                      Commissioner of Patents